US012704435B2

(12) United States Patent
Drapeau et al.

(10) Patent No.: US 12,704,435 B2
(45) Date of Patent: Aug. 11, 2026

(54) OPTICAL TEST DEVICE AND CONNECTOR ADAPTER

(71) Applicant: EXFO INC., Quebec (CA)

(72) Inventors: Alexandre Drapeau, Ancienne-Lorette (CA); Michel Leclerc, Quebec (CA)

(73) Assignee: EXFO INC., Quebec (CA)

( * ) Notice: Subject to any disclaimer, the term of this patent is extended or adjusted under 35 U.S.C. 154(b) by 116 days.

(21) Appl. No.: 18/661,018

(22) Filed: May 10, 2024

(65) Prior Publication Data

US 2024/0410784 A1 Dec. 12, 2024

Related U.S. Application Data

(60) Provisional application No. 63/518,173, filed on Aug. 8, 2023, provisional application No. 63/507,117, filed on Jun. 9, 2023.

(51) Int. Cl.
*G01M 11/00* (2006.01)

(52) U.S. Cl.
CPC .................................. *G01M 11/30* (2013.01)

(58) Field of Classification Search
CPC ............................... G01M 11/30; G02B 6/385
See application file for complete search history.

(56) References Cited

U.S. PATENT DOCUMENTS 4,741,616 A 5/1988 So et al.
5,082,378 A 1/1992 Muller et al.
5,214,730 A 5/1993 Nagasawa et al.
5,245,684 A 9/1993 Terao et al.
5,432,880 A 7/1995 Diner
5,530,783 A 6/1996 Belopolsky et al.
5,778,122 A 7/1998 Giebel et al.
5,825,516 A 10/1998 Walsh
(Continued)

FOREIGN PATENT DOCUMENTS

CN 103868672 A 6/2014
CN 106575020 A 4/2017
(Continued)

OTHER PUBLICATIONS

European Search Report, European Patent Application No. EP 24177777.0-1001, issued on Oct. 30, 2024.
(Continued)

*Primary Examiner* — Thanh Luu
(74) *Attorney, Agent, or Firm* — ROBIC

(57) ABSTRACT

An optical test device, in combination with a removable connector adapter, is provided. A method of testing an optical fiber is also provided. The test device comprises a test port configured to interface with optical-fiber cables having a given number of optical fibers. The connector adapter comprises a device connector adapted to connect to test port; and a fiber-under-test (FUT) connector adapted connect to an optical-fiber cable, such as a test cord connectable to the FUT. The FUT connector is configured to interface with optical-fiber cables having a number of fibers that is different from the number of fibers of the test port. The optical test device comprises a processing unit configurable to adjust the tests to be conducted based on the connector adapter detected, and to adapt the user interfaces and test parameters accordingly.

20 Claims, 9 Drawing Sheets

(56) References Cited

U.S. PATENT DOCUMENTS

| | | | | |
|---|---|---|---|---|
| 5,940,559 | A | 8/1999 | Noll | |
| 5,956,439 | A * | 9/1999 | Pimpinella | G02B 6/4455 385/16 |
| 5,960,137 | A | 9/1999 | Noll | |
| 6,012,852 | A | 1/2000 | Kadar-Kallen et al. | |
| 6,126,519 | A | 10/2000 | Minami et al. | |
| 6,174,178 | B1 | 1/2001 | Reinhold | |
| 6,416,236 | B1 | 7/2002 | Childers et al. | |
| 6,419,399 | B1 | 7/2002 | Loder et al. | |
| 6,439,777 | B1 | 8/2002 | Harrison et al. | |
| 6,540,411 | B1 | 4/2003 | Cheng | |
| 6,663,296 | B1 | 12/2003 | Blair et al. | |
| 6,733,185 | B2 | 5/2004 | Zhao et al. | |
| 6,760,516 | B2 | 7/2004 | Brun et al. | |
| 6,789,950 | B1 | 9/2004 | Loder et al. | |
| 6,877,909 | B2 | 4/2005 | Fleenor et al. | |
| 6,899,466 | B2 | 5/2005 | Manning et al. | |
| 6,926,449 | B1 | 8/2005 | Keenum et al. | |
| 6,981,802 | B2 | 1/2006 | Sasaki et al. | |
| 7,329,049 | B2 | 2/2008 | Meek et al. | |
| 7,373,069 | B2 | 5/2008 | Lazo | |
| 7,406,242 | B1 | 7/2008 | Braga | |
| 7,665,901 | B2 | 2/2010 | Kewitsch | |
| 8,175,431 | B2 | 5/2012 | Imada et al. | |
| 8,414,200 | B2 | 4/2013 | Van Noten et al. | |
| 8,480,310 | B2 | 7/2013 | Kewitsch | |
| 8,692,984 | B2 | 4/2014 | Schell et al. | |
| 8,876,402 | B2 | 11/2014 | Hikosaka | |
| 8,985,869 | B1 | 3/2015 | Peng et al. | |
| 9,366,830 | B2 | 6/2016 | Levin | |
| 9,568,701 | B2 | 2/2017 | Czosnowski et al. | |
| 9,581,775 | B2 | 2/2017 | Kondo et al. | |
| 9,654,213 | B2 | 5/2017 | Marupaduga et al. | |
| 9,846,281 | B2 | 12/2017 | Murray | |
| 9,857,540 | B2 | 1/2018 | Ahmed et al. | |
| 9,900,087 | B2 | 2/2018 | Ruchet | |
| 9,980,021 | B2 | 5/2018 | Oltman et al. | |
| 10,012,564 | B2 | 7/2018 | Irving | |
| 10,050,404 | B2 | 8/2018 | Farrow et al. | |
| 10,200,118 | B2 | 2/2019 | Ruchet | |
| 10,260,989 | B2 | 4/2019 | Hallett et al. | |
| 10,330,868 | B2 | 6/2019 | Li et al. | |
| 10,444,439 | B2 | 10/2019 | Arao et al. | |
| 10,488,597 | B2 | 11/2019 | Parikh et al. | |
| 10,656,343 | B1 | 5/2020 | Applebaum | |
| 10,690,861 | B2 | 6/2020 | Good et al. | |
| 10,801,918 | B2 | 10/2020 | Adams et al. | |
| 10,928,274 | B2 | 2/2021 | Adams et al. | |
| 11,022,520 | B2 | 6/2021 | Simard et al. | |
| 11,624,680 | B2 | 4/2023 | L'Heureux et al. | |
| 11,726,002 | B2 | 8/2023 | Simard et al. | |
| 2002/0081067 | A1 | 6/2002 | Brun et al. | |
| 2004/0120654 | A1 | 6/2004 | Kevern | |
| 2004/0170369 | A1 | 9/2004 | Pons | |
| 2004/0179788 | A1 | 9/2004 | Fleenor et al. | |
| 2004/0234204 | A1 | 11/2004 | Brun et al. | |
| 2005/0180702 | A1 | 8/2005 | Kevern et al. | |
| 2011/0026884 | A1 | 2/2011 | Hikosaka | |
| 2013/0163930 | A1 | 6/2013 | Jian | |
| 2014/0024255 | A1 | 1/2014 | Robitaille et al. | |
| 2015/0002837 | A1 | 1/2015 | Benjamin | |
| 2015/0063757 | A1 | 3/2015 | Leyva, Jr. et al. | |
| 2015/0063761 | A1 | 3/2015 | Hallett et al. | |
| 2016/0041065 | A1 | 2/2016 | L'Heureux et al. | |
| 2017/0017053 | A1 | 1/2017 | Li et al. | |
| 2018/0052289 | A1 | 2/2018 | Lin et al. | |
| 2019/0170610 | A1 * | 6/2019 | Perron | G01M 11/33 |
| 2019/0307330 | A1 | 10/2019 | Okada et al. | |
| 2020/0116590 | A1 | 4/2020 | Simard et al. | |
| 2021/0278313 | A1 | 9/2021 | Simard et al. | |
| 2022/0011194 | A1 | 1/2022 | Liu et al. | |
| 2022/0038177 | A1 | 2/2022 | He et al. | |
| 2023/0228649 | A1 | 7/2023 | Leclerc et al. | |

FOREIGN PATENT DOCUMENTS

| | | | |
|---|---|---|---|
| JP | S63233346 | A | 9/1988 |
| JP | 2002328071 | A | 11/2002 |
| KR | 20160122594 | A | 10/2016 |
| TW | M484712 | U | 8/2014 |
| WO | 2016189352 | A1 | 12/2016 |
| WO | 2018039660 | A1 | 3/2018 |
| WO | 2020112704 | A1 | 6/2020 |
| WO | 2021190347 | A1 | 9/2021 |

OTHER PUBLICATIONS

One pair of 90 degrees fiber optic adaptyer cables to go 40016 velicity right angle toslink port saver adapter; AGW10; Cable adapter; DVI; Ali express : https://www.aliexpress.com/item/One-Pair-of-90-Degrees-Fiber-Optic-Adapter-Cables-T. (Jun. 5, 2018).

AN-137 Preventing damage to optical connectors; OptoTest Corporation Headquarters 4750 Calle Quetzal Camarillo, CA 93012 USA; https://www.optotest.com/137-preventing-damage-optical-connectors/#. (Aug. 1, 2016).

Author Unknown, 'Fibre-optic communication subsystem test procedures—Part 4-5: Installed cabling plant—Attenuation measurement of MPO terminated fibre optic cabling plant using test equipment with MPO interfaces', Final draft International Standard (FDIS), Project No. IEC 61280-4-5 ED1, May 22, 2020, 75 pages, International Electrotechnical Commission, IEC SC 86C, USA.

Author Unknown, 'MPOLS-84 (P) MPOLS-85 (P) MPOLP-85 (P) SmartClass™ Fiber Multifiber Light Source Multifiber Power Meter', Operating manual BN 2329/98.21, Apr. 2020, 116 pages, Viavi Solution Inc.

James D. Kevern et al., Multifiber Ferrule Kevern et al., Statutory Invention Registration, US H2141 H, Jan. 3, 2006, 7 pages, USA.

Author Unknown, 'Test Port Adapters Reference Guide', AFL Global, AC-CAT Rev. 4, Jul. 1, 2011, Retrieved from the Internet: <URL: https://www.aflglobal.com/au/-/media/Project/AFL-Global/Product-Specification-Sheet/AFL-Oceania-PDF/Test-and-Inspection/Adapter-Reference-Guide.pdf>.

International Electrotechnical Commission, Final draft international standard, Fibre-optic communication subsystem test procedures—Part 4-1: Installed cable plant—Multimode attenuation measurement. Project No. IEC 61280-4-1 Ed. 2.0, Jan. 9, 2009, pp. 1-60. Retrieved from the Internet: <URL: https://webstore.iec.ch/publication/5095>.

* cited by examiner 18
20
22

277

276

275

274
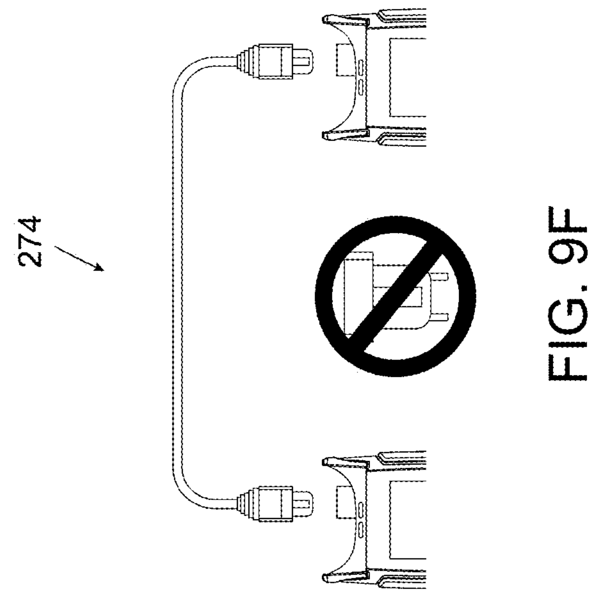
FIG. 9F
279
← FasTesT
Details
Test limits
Type A-B 9.9 m
Over limit fibers mapping
Source 2 1
Power Meter 1 2
Loss
1310 4.14 dB Fiber 2
0.00 3.00
1550 1.81 dB Fiber 2
1.00 2.50
FIG. 9E
278
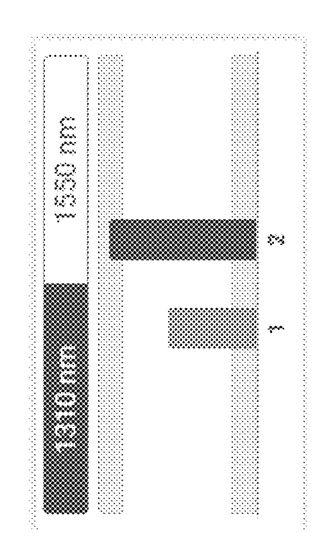
FIG. 9D

OPTICAL TEST DEVICE AND CONNECTOR ADAPTER

RELATED APPLICATIONS

This application claims priority on U.S. provisional application Ser. No. 63/507,117, filed Jun. 9, 2023, and on U.S. provisional application Ser. No. 63/518,173, filed Aug. 8, 2023, which contents are incorporated therein.

TECHNICAL FIELD

The technical field generally relates to optical test devices, and more particularly, to a connector adapter for use in combination with an optical test device. The connector adapter enables an optical test device to test optical-fiber cables having a different number of fibers, different connector gender, or different fiber-end faces than that of the test connector on the test device.

BACKGROUND OF THE INVENTION

Different types of optical test devices are available to verify and measure characteristics of optical signals, which can be indicative of the state and performance of optical fibers. Optical test devices, also referred to as optical test instruments, optical testers, or test units, include optical time-domain reflectometers (OTDRs) and Optical Loss Test Set (OLTS), as examples only.

Test devices are provided with connectors designed to connect to specific optical-fiber cables. For example, an MPO/MTP-12 port, or connector, on the test device connects to the corresponding MPO/MTP-12 connector of a 12-fiber cable. Parameters and test sequences of the test device are also programmed for a specific type of optical-fiber cable.

The challenge is that to test different types of cable, as is often the case in telecommunications installations or data centers, one will need as many test devices as there are types of cables to be tested. Although it is possible to alleviate this problem by using extension cables with different cable ends and connectors, such as adapter cords, breakout or Y-split fanout cords, these extensions do not allow the use of the one-cord reference method, which is the preferred reference method in the industry, as it results in the lowest measurement uncertainty.

Based on the foregoing, there is a need for a test device and a method for testing optical-fiber cables that can limit the number of devices to be kept, the manipulations to be carried out during the test or the configuration changes to be made on the test devices.

SUMMARY

According to an aspect, an optical test device for testing an optical-fiber cable is provided. The optical test device comprises a casing, including measurement components therein and a test port provided with fiber interfaces configured to interface with a given number of optical fibers. The optical test device also comprises or can work in combination with a connector adapter removably connectable to the test port. The connector adapter comprises a device connector adapted to connect to the test port; and a fiber-under-test (FUT) connector adapted to connect to an optical-fiber cable. The fiber-under-test (FUT) connector typically connects to the optical-fiber cable to be tested via a test cord. The FUT connector is configured to interface with optical-fiber cables having a number of fibers, or a type of fiber interface, that is different from the given number of fibers or the type of fiber interface of the test port. The optical test device comprises a processing unit configurable to adapt test parameters according to the number of fibers or according to the type of fiber interface of the optical-fiber cable to be tested.

In possible embodiments, the connector adapter may be shaped and configured as a cartridge.

In possible embodiments, the connector adapter may comprise a click-out mechanism.

In possible embodiments, the click-out mechanism can allow for a tool-free insertion and removal of the connector adapter from the test device.

In possible embodiments, the device and/or FUT connectors may be angled physical contact (APC) connectors or ultra-physical contact (UPC) connectors.

In possible embodiments, the device and/or FUT connectors may be single-fiber connectors, duplex-fiber connectors or multi-fiber connectors. The device and/or FUT connectors may be one of SC™, FC™, LC™, MDC™, SN™, CS™, MTP/MPO™, MMC™, SN-MT™ connectors, including base-8, base-12 or base-24 connectors, as examples only.

In possible embodiments, the optical device can be one of an MPO-12 native test instrument, a MPO-24 native test instrument, an Optical Loss Test Set (OLTS), a light source, a power meter or an Optical Time Domain Reflectometer (OTDR).

In possible embodiments, the casing may comprise an adapter receiving cavity, the test port being provided inside the adapter receiving cavity.

In possible embodiments, the adapter receiving cavity may be shaped and configured to receive the connector adapter at least partially therein.

In possible embodiments, the connector adapter may be an n-to-m fiber adapter, where n is the number of fiber interfaces of test port and m is the number of fiber interfaces of the test cord or FUT connector. Depending on the implementation, n may be greater or smaller than m.

In possible embodiments, the connector adapter may be a fiber gender adapter, where one of the device connector and FUT connector of the connector adapter has a pinned interface and the other connector has an unpinned interface.

In possible embodiments, the test device may be a native MPO-12 test device, and the connector adapter is an MPO-12 to duplex connector adapter.

In possible embodiments, the test device may be a native MPO-12 test device, and the connector adapter is an MPO-12 to MPO-24 connector adapter.

In possible embodiments, the processing unit may configured to automatically detect the type of connector adapter connected to the test port.

In possible embodiments, the processing unit may be configured to detect a type of connector adapter connected to the test port based on a reference cable used during the reference setting procedure.

In possible embodiments, the optical test device may comprise an identification system, allowing the processing unit to identify the type of connector adapter being connected to the test port.

In possible embodiments, the connector adapter may be provided with an RFID tag, and optical test device may comprise an RFID reader, the RFID tag providing an indication of the connector adapter type to the processing unit via the RFID reader.

In possible embodiments, the optical test device and/or connector adaptor may comprise a protection mechanism preventing unauthorized connector adapter from being used with the optical test device.

In possible embodiments, the connector adapter may be provided with an RFID tag, and the optical test device may comprise an RFID reader, the RFID tag providing an indication of the connector adapter type to the processing unit via the RFID reader.

In possible embodiments, the processing unit may comprise a reference setting assistant module adapted based on the connector adapter being connected to the test port.

In possible embodiments, the processing unit may comprise a software application adapted to exclude fiber interfaces of the test port from being tested or from being reported, based on the type of connector adapter used.

In possible embodiments, the processing unit may comprise a software application adapted to adapt an optical-fiber test sequence, based on the type of connector adapted used.

In possible embodiments, the software application may be configured to name a test result file based on the type of connector adapted used.

In possible embodiments, the reference setting assistant module is configured to enable reference parameters to be set for an optical-fiber cable having a number of fibers different from the number n of fiber interfaces of the test port using a one-cord reference optical-fiber cable, the software application enabling subsequent testing of the optical-fiber cable using the adjusted reference parameters.

In possible embodiments, the software application is configured to adjust test parameters of the optical test device by selecting only a subset of the fiber interfaces of the test port to conduct tests or measurements of the optical-fiber cable being tested.

In possible embodiments, the software application is configured to adapt graphical user interfaces reporting results of the test conducted according to the connector adapter used.

According to another aspect, a connector adapter is provided. The connector adapter is configured and adapted to removably connect to a test port of the optical test device. The connector adapter comprises a fiber-under-test (FUT) connector adapted connect to an optical-fiber cable to be tested by the optical test device, via a test cord. The FUT connector has a number m of fiber interfaces that is different from a number n of fiber interfaces of the test port. The connector adapter comprises interconnections between the fiber interfaces of the device connector and the fiber interfaces of the FUT connector. The connector adapter may comprise an identification device allowing to identify a type of connector adapter being connected to the test port.

According to possible embodiments, the optical test device can be one of: a MPO-12 native test instrument, a MPO-24 native test instrument, an Optical Loss Test Set (OLTS), a light source, a power meter or an Optical Time Domain Reflectometer (OTDR). For example, the test device can be a native MPO-12 test device, and the connector adapter can be a MPO-12 to duplex connector adapter. As another example, the test device can be a native MPO-12 test device, and the connector adapter can be a MPO-12 to MPO-24 connector adapter.

In possible embodiments, the processing unit and associated software interfaces and instructions can be configured to detect a type of connector adapter connected to the test port. The detection can be based on a reference cable used during the reference setting procedure. In possible embodiments, the connector adapter may be provided with an RFID tag, and the optical test device may comprise an RFID reader, the RFID tag providing an indication of the connector adapter type to the processing unit via the RFID reader.

According to another aspect, a method to convert an optical test device and to test an optical-fiber cable with the optical test device is also provided. The method comprises connecting a connector adapter as described above to the optical test device. The method also comprises connecting the optical-fiber cable to be tested, such as via a test cord, to the FUT connector of the connector adapter. The method also comprises adjusting test parameters of the optical test device based on the connector adapter type being connected.

In possible implementations, connecting the connector adapter to the optical test device may comprise inserting the connector adapter at least partially in a receiving cavity of the test device.

In possible implementations, the method may comprise automatically detecting a type of connector adapter connected to the test device.

In possible implementations, the method may comprise detecting a type of connector adapter connected based on the reference cable used during the reference setting procedure, for example by detecting that a subset of optical-fibers of the reference cable was tested as defective or generated errors.

In possible implementations, the method may comprise detecting a type of connector adapter connected to the test device based on information contained in an RFID or contact tag provided on the connector adapter.

In possible implementations, the method may comprise a step of setting reference parameters using a one-cord reference optical-fiber cable and a step of testing the optical fiber using the adjusted test parameters.

In possible implementations, adjusting the test parameters of the optical test device may comprise selecting only a subset of the fiber interfaces of the test port to conduct tests or measurements of the optical-fiber cable being tested and adapting the software application interfaces accordingly.

In possible implementations, the method may comprise excluding fiber interfaces of the test port that are not used by the connector adapter when measuring characteristics of the optical-fiber cable during the acquisition process and adapting graphical user interfaces of the optical test device accordingly.

In possible implementations, adjusting the test parameters of the optical test device may comprise adapting the sequence of tests applied at the fiber interfaces of the optical test device.

Further features and advantages of the present invention will become apparent to those of ordinary skill in the art upon reading of the following description, taken in conjunction with the appended drawings.

BRIEF DESCRIPTION OF DRAWINGS

FIGS. 9A to 9F illustrate graphical user interfaces adapted based on the connector adapter connected to the optical test device, according to a possible embodiment.

DETAILED DESCRIPTION

Figure 1:
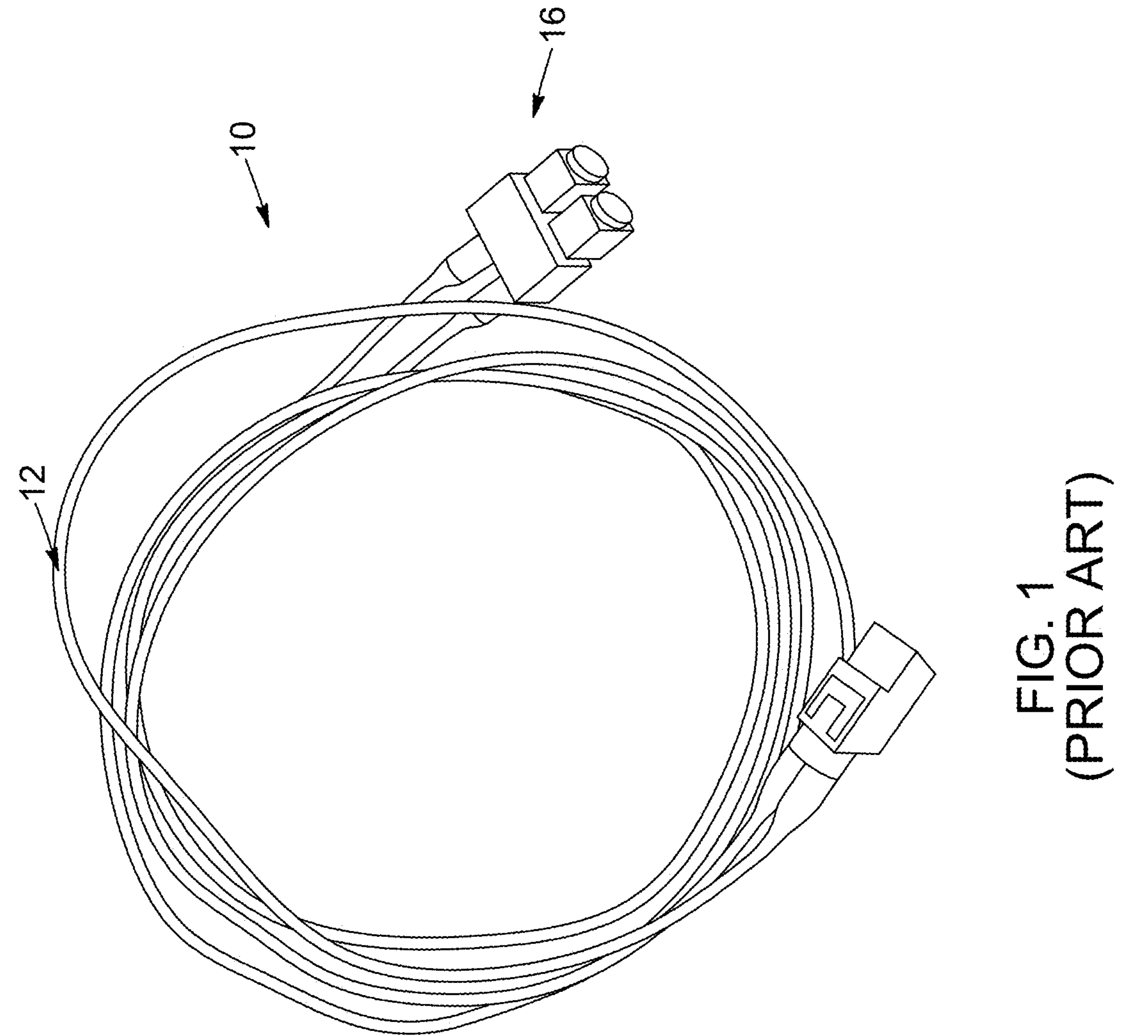
FIG. 1 illustrates a duplex optical-fiber cable (prior art).

In the following description, similar features in the drawings have been given similar reference numerals and, to not unduly encumber the figures, some elements may not be indicated on some figures if they were already identified in a preceding figure. It should be understood herein that the elements of the drawings are not necessarily depicted to scale. It should also be noted that positional descriptors such as up and down, inner and outer, and other similar terms indicating the position or orientation of one element with respect to another element are used herein for ease and clarity of description and should, unless otherwise indicated, be taken in the context of the figures and should not be considered limiting. It will be understood that such spatially relative terms are intended to encompass different orientations in use or operation of the present embodiments, in addition to the orientations exemplified in the figures.

In the present description, and unless stated otherwise, the terms “connected,” “linked” or “coupled” and variants and derivatives thereof refer to any connection or coupling, either direct or indirect, between two or more elements. The connection or coupling between the elements may be mechanical, physical, operational, electrical or a combination thereof.

Figures 2A, 2B, 2C, 2D, 3A, 3B, 3C, 4A, 4B:
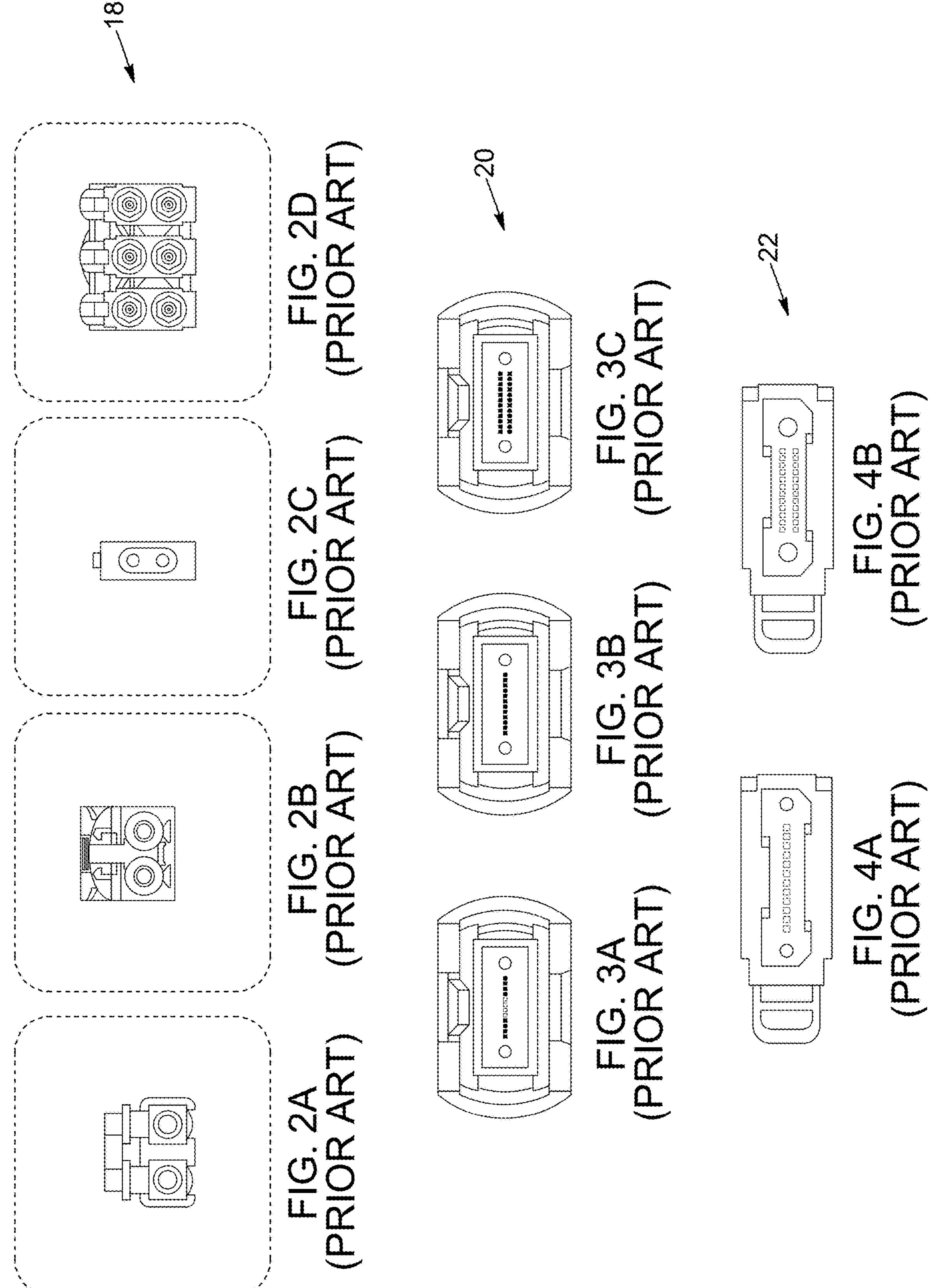
FIGS. 2A to 2D illustrate different types of connectors for duplex optical-fiber cables (prior art).
FIGS. 3A to 3C illustrate MPO/MTP connectors for multiple optical-fiber cables (prior art).
FIGS. 4A and 4B illustrate MMC connectors for multiple optical-fiber cables (prior art).

Referring to FIG. 1, a schematic illustration of an optical-fiber cable 10 is shown. The optical-fiber cable comprising one or more optical fibers 12 (or fiber optics), cladding, coating and other components covering and/or protecting the fiber(s) and cable connectors 16 at each cable end. An optical-fiber cable can also be referred to as an optical-fiber link, a fiber-optic cable or a fiber-optic link. In FIG. 1, the optical-fiber cable is a duplex optical fiber (i.e., 2-fiber cable), and the connectors are duplex connectors, an example of which is shown in FIG. 2B. There are different types of duplex connectors 18, such as LC™, CS™ and SN™ duplex connectors, shown in FIGS. 2A, 2B and 2C, respectively. Some connectors also allow several duplex fibers to be paired side by side, such as MDC™ connectors, shown in FIG. 2D.

Referring to FIGS. 3A-3C and 4A-4B, there are several other types of multifiber cables and connectors 16, such as 4, 8, 10, 12, 16 or 24-fiber cables and connectors. FIGS. 3A to 3C show examples of MPO/MTP connectors 20, including 8, 12 and 24 MPO/MTP connectors (Multi Fiber Push On/Multi Fiber Termination Push-On), respectively in FIGS. 3A, 3B and 3C, which can include alignment/securing pins or not, and referred to as pinned or unpinned connectors. FIG. 4A shows a MMC-16 USconec™ connector and FIG. 4B show an MMC-24 USconec™ connector. There can also be angled physical contact (APC) connectors or ultra-physical contact (UPC) connectors, depending on the configuration of the end face of the fiber. As connector shapes and the number of fibers per cable evolve, there is a need for optical test equipment to accommodate different connector types and to be able to test and measure optical characteristics of, or via, optical-fiber cables having different numbers of fibers. A type of connector can be defined based on its number of fibers, on the fiber layout, on the end faces of the fibers, on whether it includes pins or not, on the connector gender (male/female) and the likes. An optical test device for measuring the optical loss would ideally be able to universally apply the one-cord or a one-cord equivalent reference method to any of such optical-fiber device under test.

Figure 5:
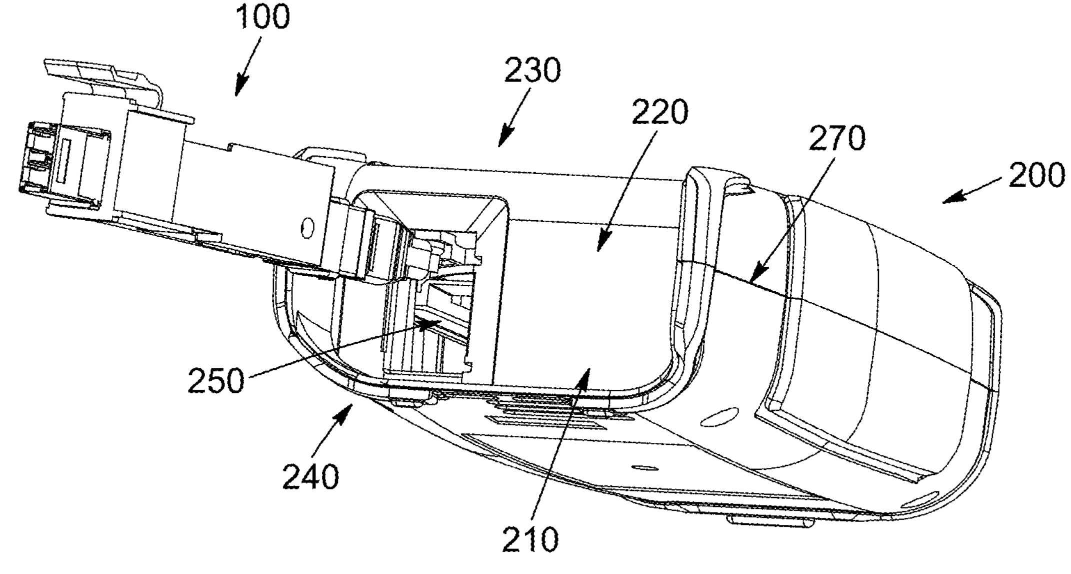
FIG. 5 is a perspective view of an optical test device and of a connector adapter, according to a possible embodiment.
Figure 6:
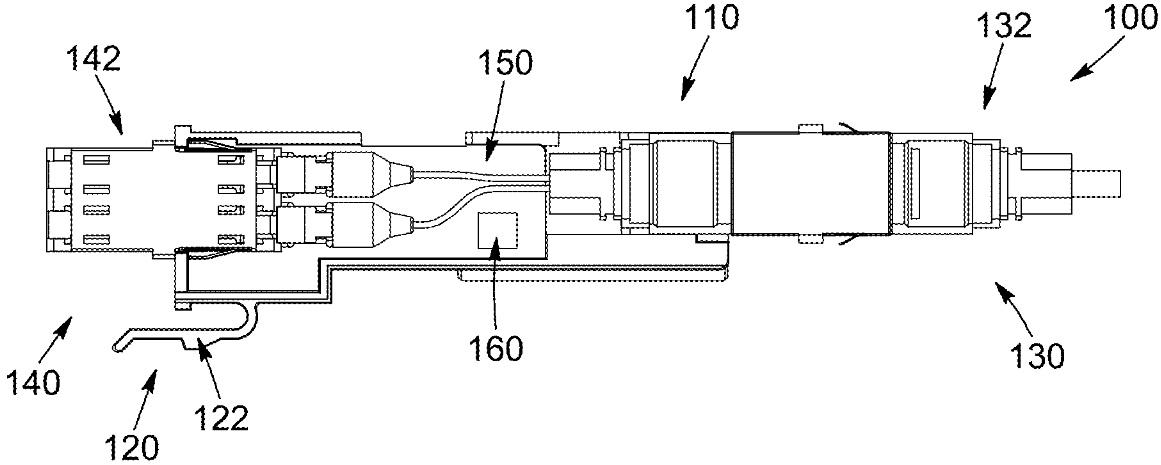
FIG. 6 is a side view of a connector adapter, according to a possible embodiment.

Referring to FIGS. 5 and 6, there is herein proposed a connector adapter 100 that allows converting an optical test device 200 provided with a given type of test port 240 and configured to test a specific type of optical-fiber cable, into an optical test device 200 that can test other types of optical-fiber cables. Also proposed is the optical test device 200, which can also be referred to as an optical test instrument or an optical test unit, which can be configured or adapted based on the connector adapter connected thereto, and the associated testing method.

The optical test device 200 has a casing 210, or housing, which includes measurement components 220 to measure different characteristics of the fibers or devices being tested. The optical test device 200 also includes a processing unit 270 which can be configured to adapt testing or test parameters according to the type of optical-fiber cable and based on the connector adapter connected to the optical test device. The processing unit 270 can include controller(s), such a microcontroller(s), and memory (including for example RAM, such as DRAM, SRAM, SDRAM, and the like, ROM, flash, SSD or variants thereof), to control or communicate with light sources and/or measurement components 220, including for example controlling the sequence of tests to be conducted, selecting on which fiber interfaces (or fiber end-faces) light is to be emitted or detected, and adapting the different graphical user interfaces associated with testing a particular type of optical-fiber cable or equipment.

The processing unit 270 also executes a software application, including different graphical user interfaces displayed by the display screen 230 of the test device, through which different parameters and selections can be set by users, to determine the tests to be conducted. The software application can be embodied as processor-readable instructions stored in memory of the processing unit, and executable by a processor. The processing unit 270, via the software application, produce measures characterizing the optical-fiber cable or end-equipment being tested, from light reflections captured by the measurement components on selected ones of the fiber end faces of the connector adapter. The inspection results, including measures of signal attenuation, may comprise a pass/fail determination for each fiber of the cable, based on at least one acceptance criterion, e.g., pass/fail thresholds. Other characteristics can include power attenuation, length of the cable, breaks on the fibers and the likes. Acceptance criteria may be based on industry standards and be dependent upon the optical-fiber cable being tested. In possible embodiments, the optical fiber under test (FUT), also referred to as optical-fiber cable, can be selected by the user and the corresponding acceptance criteria are applied. Acceptance criteria may be also hardcoded in memory of the processing unit 270 or be made programmable, user-customizable or user-selectable among sets of acceptance criteria saved in memory. Depending on the connector adapter 100 connected to the optical test device 200, the processing unit 270 can adapt test parameters, including for example the fibers to illuminate or to consider during testing, pass/fail thresholds, test sequences, results reports, graphical user interfaces presenting the test results, and the likes.

The optical test device 200 comprises a user interface embodied by a display screen 230, which may optionally be a touch screen. Examples of graphical user interfaces 276 which can be displayed on the display screen are shown on FIGS. 9A to 9F. In other embodiments, the optical test device 200 may not comprise a display screen and use, as a user interface, a separate terminal such as a mobile device wirelessly connected to the optical test device 200 (via Bluetooth for example). User interfaces may be provided via a physically distinct mobile device, such as a handheld computer, a smartphone, a tablet computer, a laptop computer, a wearable computer or the like, e.g., communicatively coupled to the optical test device. In such cases, at least some modules of the software application may be located in a memory of such a mobile device, for execution by a processor of the physically distinct device. A module is a set of logical functions and routines designed to accomplish a given set of tasks and which can be easily reused or updated.

Figures 10A, 10B:
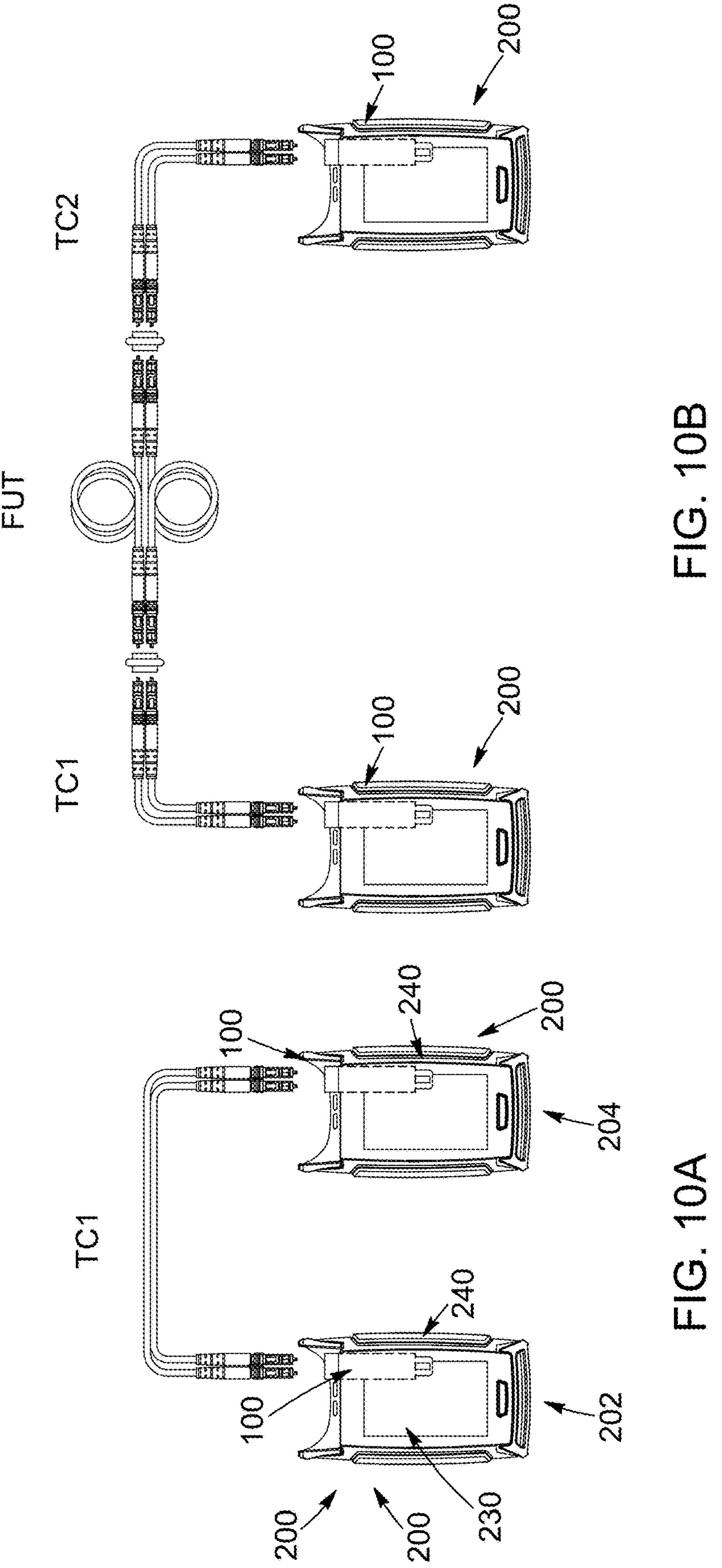
FIGS. 10A and 10B are schematic illustrations of connections for testing a duplex optical-fiber cable using a native MPO-12 optical test device provided with an MPO-12 to duplex connector adapter, according to a possible embodiment.

Still referring to FIGS. 5 and 6, the connector adapter 100 may be connectable to the optical test device 200, on the test port 240 (or test connector) to which the optical-fiber test cable should be connected. As shown in FIGS. 10A and 10B, the optical-fiber cable to be tested (FUT) is typically connected to a test cord (TC), which in turn is connected to the optical device 200. Back to FIGS. 5 and 6, the connector adapter 100 comprises a device end 130 (or device side) provided with a device connector 132 (identified in FIG. 6) adapted to removably connect to the test port 240 of the optical test device 200. The test port 240 on the device is a connection point or interface between the optical test device and an optical-fiber cable, such as a test cord via which a FUT is being tested. The connector adapter 100 as another end or side, referred to as the FUT end 140, provided with a FUT connector 142. This FUT connector 142 is adapted to connect to an optical-fiber cable, typically a test cord. Here, we refer to end device 140 as a FUT end, to indicate the side of the adapter where the FUT will be tested, knowing that it is typically a test-cord that connects to this side, to test the FUT. The FUT connector 142 is adapted to connect to a cable or link having more or less optical fibers than that of the test port 240 of the optical device 200. Thus, the FUT connector 142 of the adapter has a number m of fiber interface(s) that is different from a number n of fiber interface(s) of the test port, and consequently of fiber interfaces of the device connector. "Fiber interfaces" refers to the end faces or end portions of the fibers that are aligned and/or in contact when connected. The connector adapter 100 also comprises interconnections 150 linking the fiber interfaces of the device connector 132 and the fiber interfaces of the FUT connector 142. These interconnections 150 can include adapter fibers or cables extending between the FUT and device connectors 132,142. One understands that the FUT connector 142 of the connector adapter 100 doesn't have to be connected directly to the fiber to be tested, but rather to the test cord that will be connected to the FUT. We still refer to this connector as the FUT connector, for simplicity and as it is on the side of the optical-fiber cable to be tested.

Figure 7:
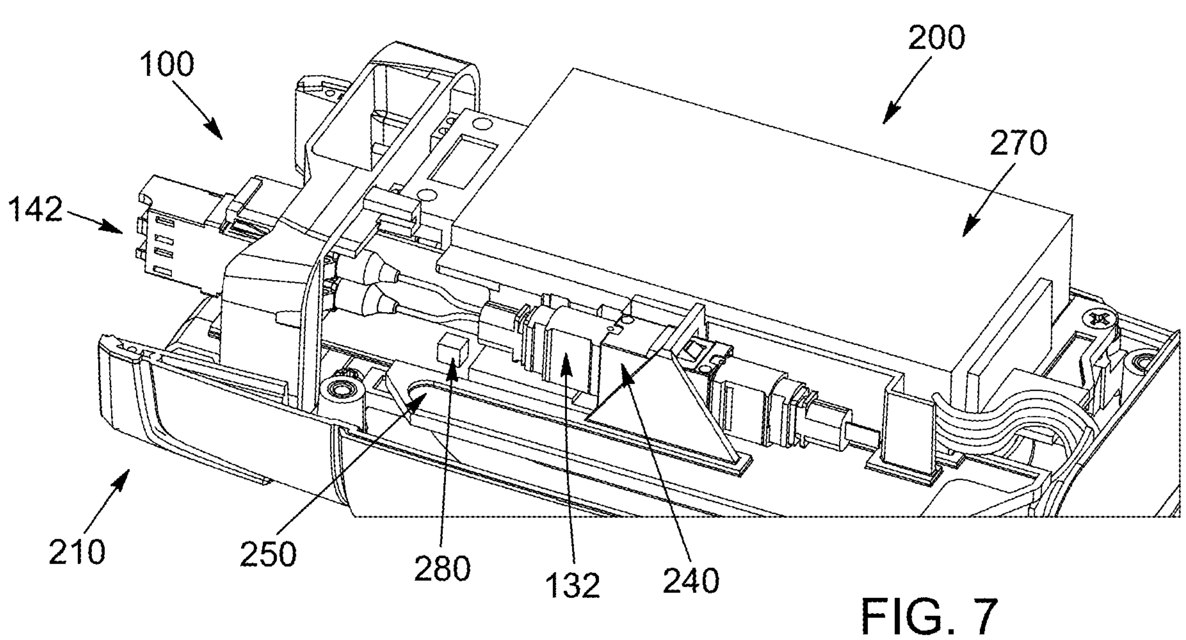
FIG. 7 is a partial perspective view of an optical test device with a connector adapter connected thereto, according to a possible embodiment.

Still referring to FIGS. 5 and 6, and also to FIG. 7, the connector adapter 100 can be shaped and configured as a cartridge 110, or cassette. In this embodiment, the cartridge has shape reminiscent of a rectangular prism, and includes an elongated casing, with the device and FUT connectors 132, 142 provided at opposed ends of the casing. By configuring the connector adapter 100 as a cartridge 110, it can be easily inserted into an adapter receiving cavity 250 created for this purpose in the optical test device 200, with the test port 240 located at the inner end of the cavity 250. In this way, the adapter 100 is not bulky since it fits at least partly inside the optical test device 200. That said, it is possible for the connector adapter 100 to have a different configuration and shape. For example, the connector adapter 100 can be shaped and configured as an external attachment or sleeve that partly matches the outer surface of the device casing 210. Other configurations are also possible.

According to a possible embodiment, the connector adapter 100 comprises a click-out or swap-out mechanism 120, provided on the device end 130. The click-out mechanism 120 can allow for a tool-free insertion and removal of the connector adapter 100 from the optical test device 200. The click-out mechanism 120 can include a resilient element 122 which can be pressed when inserted in the optical test device 200, and which can be pulled out by manually pressing or pulling of the connector adapter 200. In other possible embodiments, in order to reduce the risk of inadvertent insertion and extraction, a hand-screwable "thumbscrew" can be provided to secure adapter while still allowing a tool-free insertion of the adaptor.

Figure 8:
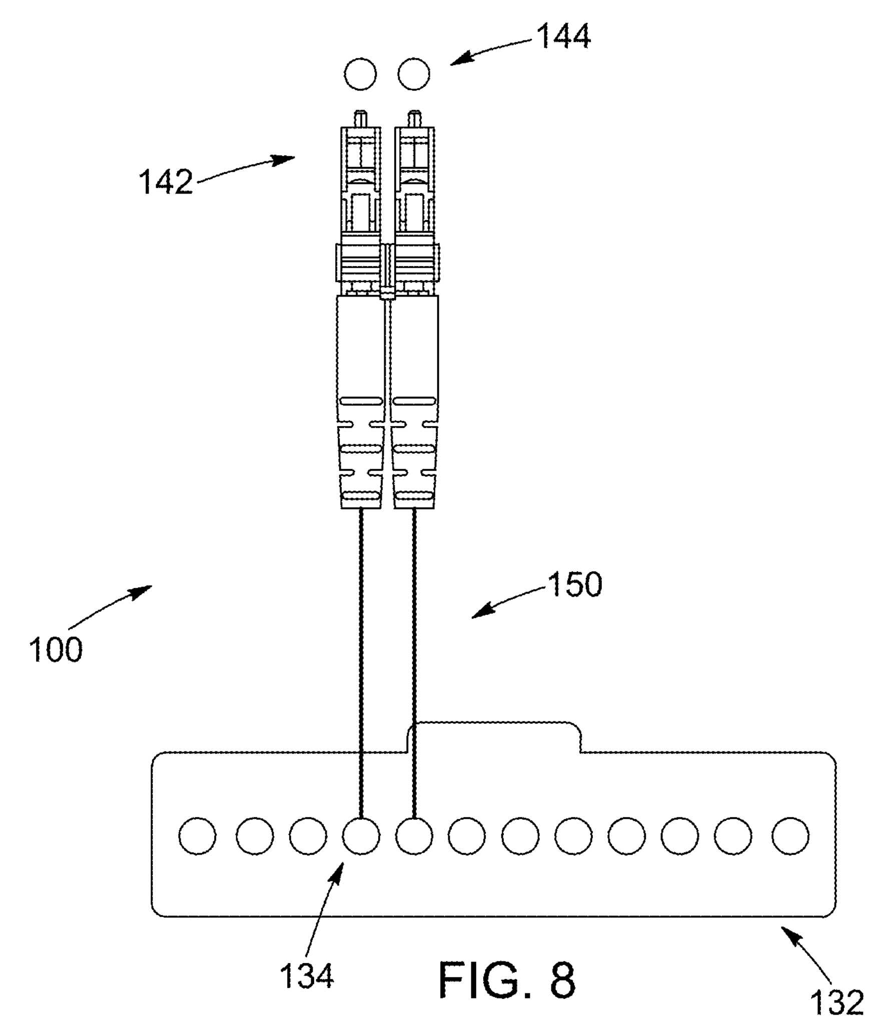
FIG. 8 is a schematic illustration of connections in an MPO-12 to duplex connector adapter, according to a possible embodiment.
Figure 9C:
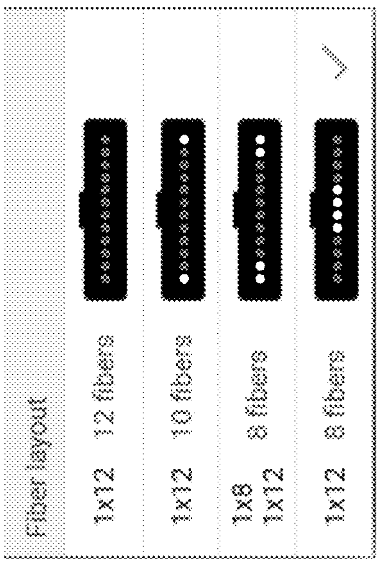
Figure 9B:
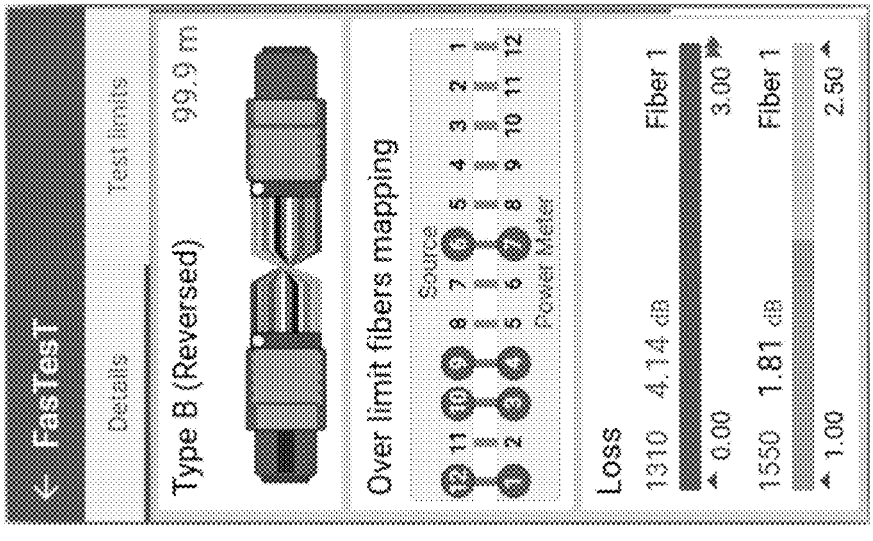
Figure 9A:
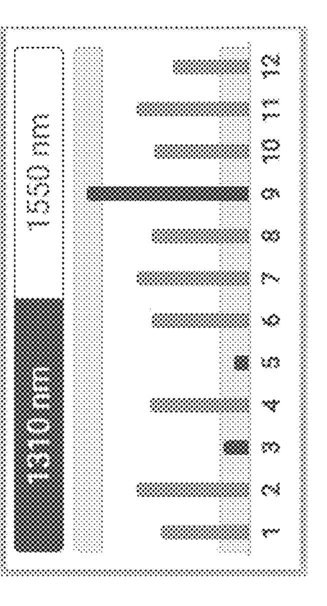

FIG. 8 is a schematic representation of the interconnections of a connector adapter 100 in which the FUT-side connector 142 is a duplex connector and the device-side connector 132 is a 12-fiber connector. In this exemplary embodiment, the test device may a native MPO-12 optical test device, and the connector adapter 100 may be an MPO-12 to duplex connector adapter. The processing unit, via the software application, can be configured to adapt the optical tests to be conducted based on the type of the connector adapter. Connector adapters with various numbers of fibers can be provided. According to an embodiment, an MPO-12 test device intended to test 12-fiber cables (or links) can be converted within a few seconds into a duplex test device. For example, the processing unit 270, via the software application controlling operations of the optical test device, can be configured to have the measurement components 220 of the MPO-12 test device to perform length measurements only on specific fiber(s) 134 among the 12 fibers of the test port 240, e.g., fiber #4. In this case, an MPO-12 to duplex connector adapter 100 connected to the MPO-12 test device is configured to use the same fiber (#4) 144 in combination of another fiber (fiber #5) that is not coupled with the same source laser. In some embodiments, an MPO-12 optical test device can include an inline Visual Fault Locator (VFL) on a specific fiber. In this case, the VFL fiber is included in the fibers selected for duplex testing via the duplex connector adapter. Any fiber that is not used by the duplex connector adapter may be excluded from measurements during acquisition process and the software application will adapt the testing and reporting accordingly.

As can be appreciated, the proposed connector adapter 100 and software application can be used to convert a native optical test device, provided with a specific type of test port, into a test device 200 which can test optical-fiber cables and devices having different number of fibers and/or different types of connectors. The connector adapter 100 can be any type of n-to-m fiber adapter, where n is the number of fiber interfaces of test port and m is the number of fiber interfaces of the FUT connector, and where n can be greater or smaller than m. The device and/or FUT connectors 132, 142 of the connector adapter can be angled physical contact (APC) connectors or ultra-physical contact (UPC) connectors. The device and/or FUT connectors of the connector adapter may also be LC, CS, SN or MDC duplex connectors; or any type of MTP/MPO connectors. The connector adapter may also be a fiber gender adapter, where the device connector and FUT connector of the connector adapter have the same gender type, such as a pinned or unpinned interface (male/male or female/female), thus allowing an optical-fiber cable ending with the same gender type connector as the optical test device to be connected to one another, via the connector adapter. The connector adapter allows in-field conversion of the connector interface of the optical test device to adapt to different connector types, based on gender, pin and fiber configurations, including MPO-12, MPO-24 and duplex connectors.

Thus, the optical-fiber cables that can be tested with the proposed connector adapter 100 can be single fiber, duplex-fibers or multi-fiber cables. The device and/or FUT connector of the connector adaptor can be single-fiber connectors, including for example Subscriber Connectors (SC) or Ferrule Connector (FC); duplex-fiber connectors, including for example Lucent Connectors (LC), MDC™, SN™ and CS™ connectors; or multi-fiber connectors, such as multi-fiber base-8, base-12 or base-24 fiber connectors, including for example MTP/MPO™, MMC™, SN-MT™ connectors. The optical test device 200 can be an MPO-12 native test instrument, an MPO-24 native test instrument, an Optical Loss Test Set (OLTS), a light source, a power meter or an Optical Time Domain Reflectometer (OTDR), provided as examples only. These optical test devices 200 can be adapted by downloading software patches or upgrades that support testing of different optical-fiber cables. The adaptation can involve illuminating specific fibers of the test port during testing/measurements by the device, or not reporting or considering measures made on specific fibers of the test port.

In possible embodiments, the processing unit 270 of the optical test device is configured, via the software application alone or in combination with another identification device, to automatically detect the type of connector adapter 100 connected to, or near, the test port 240 of the test device 200, using an adapter detection module or system. The connector adapter detection can be performed based on optical, electrical or mechanical interaction between the connector adapter and the optical test device. This interaction may occur when the connector adapter is connected to the test device or using a separate identification system. Detection of the connector adapter can be made via a separate device such as a smartphone or other mobile device in communication (e.g. a wireless communication via Bluetooth™) with the optical test device. In some embodiments, a photo of the connector adapter can be captured using a camera and an image recognition algorithm to detect the type of connector adapter. A visual tag may be affixed, engraved or printed on an outer surface of the connector adapter, such as a linear, a 2D barcode (e.g. a QR code) or any type of custom visual tag, for detection via a photo camera on a smartphone or on the optical test device. Other types of tags may also be used to automatically detect the type of adapter inserted, such as contact tags or contact sensors.

Still referring to FIGS. 6 and 7, in a possible embodiment, an adapter detection module or system may be based on the RFID technology or on any other detection technologies, including for example proximity or contact sensors. The connector adapter 100 can be provided with a tag 160, and the optical test device 200 may include a reader 280. In possible embodiments, the tag 160 can be an RFID tag, and the reader 280 can be an RFID reader, provided as a RFID controller chip positioned on an electronic board on or in communication with the processing unit 270 and as RFID antenna. Components of the reader 280, such as the antenna, can be positioned so as to be aligned with the tag 160 located on the connector adapter 100 when the adapter is in place inside the adapter receiving cavity 250. The tag 160 on the connector adapter provides an indication of the connector adapter type to the processing unit 270, via the reader 280. The information stored on or provided by the tag 160 can be indicative of the type of the connector adapter, including the fiber type (single mode vs multimode and UPC vs APC), the fiber layout type (single-fiber, multi-fiber or duplex-fiber), the serial number of the connector adapter and/or any other relevant information. Based on the connector adapter type detected, the different user interfaces of the test device 200 can be adapted, such as the reference setting assistant module or the test and measurement interfaces.

Advantageously, the identification device, such as the RFID tag and reader 160, 280, or alternatively contact sensors, reduces human interactions and configuration changes in the software application, when first connecting a connector adapter or when swapping between connector adapters, thus reducing the risk of configuration errors. Using an identification device allows the optical test device 200 to automatically recognize the connector adapter 100 used, triggering the setting of corresponding test parameters in the software application, for example by selecting only a subset of fibers on the device port 240 when conducting measurements, the subset of fibers corresponding to the fibers of the FUT connector 142 of the connector adapter 100, and thus of the fibers of optical-fiber cable being tested. Acceptance criteria (e.g., pass/fail thresholds) and acquisition parameters can be at least partly based on the recognized type of connector adapter. When the processing unit 270 is not able to set the test parameters directly based on the connector adapter detected, it can determine a limited number of options for acceptance criteria based on the type of connector adapter detected. A limited number of options can be presented to the user on the user interface 276 for user selection. Options that are incompatible with the type of connector adapter detected can be blocked or grayed out on the screen. In some other embodiments, information of the fiber configuration can be stored directly on a tag or via other means, such that an optical test device that is not natively designed to test a given type of optical-fiber cable can be easily converted into a test device that can support it, by downloading or upgrading software patches or updates.

In possible embodiments, information stored in a tag 160 can be read-only, to avoid alteration and counterfeiting of the connector adapter 100. The information stored in the a tag 160 can be programmed at the factory and encrypted, to prevent extraction of the information stored thereon. Given that tags may need to be wirelessly powered, such as in the case of RFID readers, the processing unit 270, via the software application or via firmware provided on the detecting sensor microchip, can include an adapter-detection module that is not only adapted to read and store the connector adapter type, but that can also be configured to minimize power consumption of the tag reader/sensor. For example, an RFID module can be programmed with a RFID reading scheme according to which the RFID tag is read only at specific moments, so as to reduce or limit power consumption by the RFID components. For example, the adapter-detection module may allow powering of the tag reader or sensor only when the optical test device is turned on. Alternatively, the adapter-detection module may control the tag reader by having it scan for tags only at predefined time intervals or when a specific test operation is launched, such as when an acquisition is launched, when a user presses start or save icons or buttons, or when a connection continuity is detected on fibers of the test port, for example when detecting contact between the fiber interfaces of the test port and fiber interfaces of the device connector of the adapter and/or when detecting contact with fiber interfaces of the FUT and the FUT connector of the adapter. In possible embodiment, other than to connect the connector adapter 100 to the test port 240, no user intervention may be needed to detect the connector adapter by the software application of the optical test device.

In possible embodiments, the connector adapter 100 and/or the adapter receiving cavity 250 of the optical test device 200 may include a protection mechanism against unauthorized copies of connector adapter. For example, for connector adapters provided with RFID tags, the processing unit 270 of the optical test device can be configured to distinguish genuine connector adapters from unauthorized low-cost copies, based on adapter identification information stored in the RFID tag. The same technique can be used for other types of sensors, such as contact or proximity sensors. A protection mechanism can help prevent counterfeiting of certified or genuine connector adapters. The adapter identification information can be included in measurement data or measurement result files for traceability. For example, the serial number of the connector adapter can be saved in the test results for traceability. The software application can also be configured to display a warning on the display screen 230 of the optical test device 200 when an unauthorized connector adapter is detected.

According to a possible embodiment, instead of using an identification device provided on the connector adapter and/or in the optical test device, the processing unit 270, via the software application, can be configured to detect a type of connector adapter based on the reference cable used during the reference setting procedure. The automatic detection may also be performed using the optical-fiber being tested, rather than the reference cable, but using the reference cable may be more convenient, as for most tests to be carried out, the user must necessarily set the reference parameters with the one-cord/reference cable. The one-cord reference method is the preferred Light Source Power Meter (LSPM) test method in the industry because it minimizes the loss measurement uncertainty while including the insertion losses associated with both end connectors of the Fiber (or link) Under Test (FUT). The software application may include an automatic adapter detection module that detects the type of connector adapter, and thus the type of FUT to be tested, based on the continuity detected on fiber interfaces of the test port when performing the one-cord reference method. Instead of using an identification device to automatically detect the connector adapter, the reference setting assistant module of the software application may be configured to detect, when a reference cord is connected at the FUT connector of the adapter, fibers that are not active or illuminated at the interface of the adapter and test port. The user interface of the reference assistant software may also be configured to request confirmation from the user that a specific reference cord type and/or a specific connector adapter is being used, and can adapt the reference parameters settings accordingly, and also adapt the remainder of the testing procedure accordingly.

For example, if a duplex reference cable (or duplex reference cord) is used to set the reference parameters (such as optical loss in dB or optical power in dBm, length of the reference cable, cable polarity, including type A, B and C for MPO cables and type A/B or A/A for duplex cables) on a MPO-12 test device, the MPO-12 test device may detect that only 2 fibers out of the 12 fibers on the test port are illuminated and have continuity and adapt the test parameters accordingly. Optionally, the user interface 276 of the reference assistant module can be configured to request confirmation from the user that an MPO-12 to duplex connector is used and adapt the reference setting process and the subsequent test process accordingly, by considering only two out of the 12 fibers on the test port 240. Thus, for other types of adapters, if only x fibers out of the y fibers of the test port are lit and show continuity, the device can adapt the test parameters accordingly, and request confirmation on the connector adapter type from the user or not. Assisted referencing steps, such as test cord required, test cord images, connection diagrams and connector gender warning may be adapted accordingly. Adapting the test parameters or test settings may also translate in illuminating only selected ones of the fibers of the test port 240, or of considering, when reporting the results, only selected ones of the fibers.

Referring now to FIGS. 9A to 9F, regardless of the detection method used to identify the connector adapter, may it be through manual configuration, fiber continuity detection or using tags (RFID or contact-sensors), the different user interfaces 276 and modules of the software application can be adapted based on the connector adapter detected. For example, the processing unit 270 of the test device, via the software application, can automatically exclude from Pass/Fail test the fibers that are not available with the detected connector adapter. Parameter setting on the optical test device, such as cable polarity detection and polarity threshold for MPO or Duplex FUT may be automatically adapted according to the connector adapter used. User interfaces 275-279 related to setting reference parameters or presenting the results can be adapted, such as by graphically displaying the connection of the reference cord to the connector adapter detected, and warnings 274 can be adapted accordingly, as in FIG. 9F. The fiber layout of the connector adapter can also be displayed 277, as in FIG. 9C, based on the connector adapter detected. For example, a device that is natively designed for testing m-fiber optical cables can be configured with default graphical use interfaces showing m-fiber interfaces 276, with bar charts 275 for all m-fibers. If a connector adapter is detected by the optical test device, the software on the device may adapt testing and graphical user interfaces for the n-fiber cable. As shown with FIGS. 9A, 9B vs. 9D and 9E, an MPO-12 test device (FIGS. 9A and 9B) is converted into a duplex test device (FIGS. 9D and 9E) following the detection of an MPO-12 to duplex connector adapter, such that the graphical user interfaces 275 and 276 (for 12-fibers) are replaced with graphical user interfaces 278 and 279 (for 2-fibers). The user interfaces related to measurement results, including visual representations of the results, such as the bar graphs, margin meter, result tables and polarity diagrams may be automatically adapted to exclude unavailable fibers. The adapter detection module can also be configured to trigger a specific test sequence based on the standard tests typically applied for optical-fiber cables compatible with the type of connector adapter connected to the test device. For example, for MPO-16 or MPO-24 connector adapters, users may be guided to conduct the acquisition process in two steps, using the one-cord reference method.

When a new type of connector adapter is detected, the software application can be configured to inform the user, via a user interface, that setting new reference parameters is required prior to performing a new test on the FUT. In some embodiments, when the processing unit 270 of the optical test device 200 detects a new connector adapter 100, previous reference parameters set for a different connector adapter type may become invalid or inaccessible. The automatic adapter detection module thus helps reducing the risk of using incorrect reference parameters, which would result in incorrect test results.

In possible embodiments, the automatic detection module can be configured to inform users of the compatibility of the FUT about to be tested based on the type of connector adapter detected, that is, based on whether the pin, gender and/or number of fibers of the connector adapter is compatible with the FUT and/or with the parameters set in the software application. If incompatibility is detected between the FUT, the connector adapter and/or the device test port, the processing unit 270 of the test device 200, via the software application, can be configured to display a warning message to prevent users from proceeding with an incompatible connection, thereby preventing possible damage to the FUT, connector adapter or optical test device.

In possible embodiments, the detection module can be configured to name the test result file(s) based on the type of connector adapted used. More specifically, the detection module can be configured to adapt naming of the test result files according to the fiber layout of the connector adapter 100. For example, when a duplex connector adapter is detected, the name of the test result file can be adjusted to include a fiber pair indicator. For example, the names of the result test files include references such as FiberTx and FiberRx when a duplex connector adapter is used, while the name of the test result file for the native MPO-12 test can include references such as Cable1_12. Similarly, when MPO-24 connectors are used, the name of the test result files can include references such as Cable1_1-12 and Cable1_13-24.

According to a possible implementation, FIGS. 10A and 10B illustrate connections to conduct the one-cord reference method when using MPO-12 to duplex connector adapters 100 so as to test a duplex optical-fiber cable using a native MPO-12 test device, an OLTS in this case. As shown on FIG. 10A, in conformity with one-cord referencing standards, and as described in Annex A of the IEC 61280-4-5 Standard, a single test cord TC1 is referenced. The internal fibers of the connector adapter 100, used to interconnect the device and FUT connectors, are in continuity with the fibers of the device test port. FIG. 10A shows the reference cable TC1 disconnected from the adapters 100 for clarity, but it is understood that during the one-cord referencing procedure, the TC1 cable is connected at both ends to the light source 202 and power meter 204 adapters. In this possible implementation, in compliance with fiber testing standards, the connector adapter 240 on the power meter 204 side can have large-core fibers to capture all the light emitted by the light source 202 on the fiber under test (FUT). A large-core fiber may have a core diameter above 50 μm, such as between 100 μm and up to 400 μm. The core can be more than 50% of the cross-sectional area of the entire fiber, with the fiber cladding. FIG. 10B shows the connections to proceed with fiber under test (FUT) measurements, the duplex FUT being connected at one end to the TC1 cable (duplex to duplex) and at the other end to the TC2 cable (duplex to duplex), the light source 202 being connected to the TC1 cable, and the power meter 204 being connected to the TC2 cable. Given that the connector adapter 100, when connected to the respective test ports 240, acts as a single test device with the optical test device 200, market acceptance is facilitated, and certification requirements can be met. The combination of a connector adapter with an optical test device as proposed herein, especially for embodiments where the connector adapter is received within the optical test device 200, as illustrated, is more likely to be adopted by end users a "native" optical test device, regardless of the type of connector adapter used.

Figures 11A, 11B, 11C:
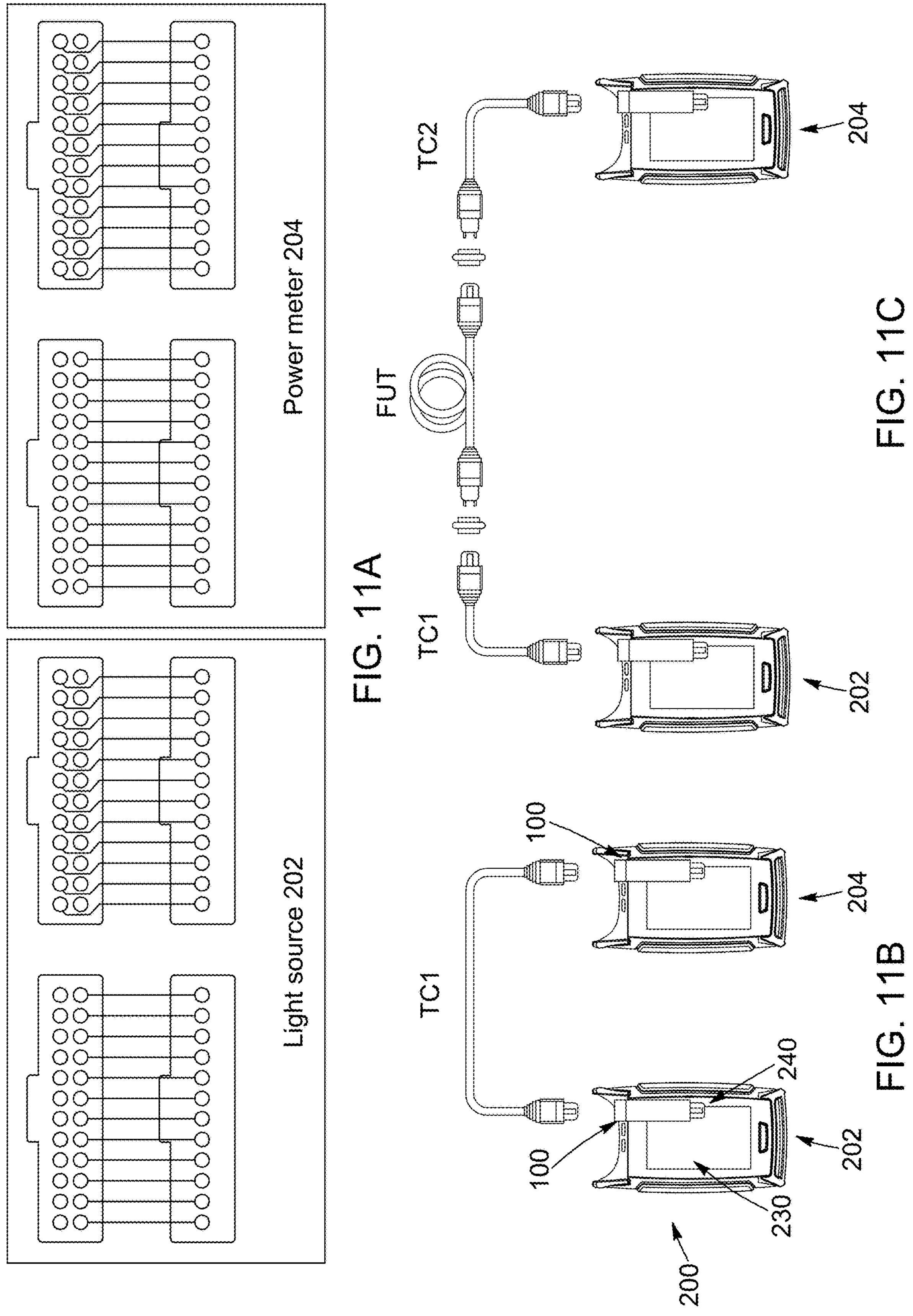
FIGS. 11A, 11B and 11C are schematic illustrations of connections for testing an MPO-24 optical-fiber cable using a native MPO-12 optical test device provided with an MPO-12 to MPO-24 connector adapters, according to a possible embodiment.
Figure 12:
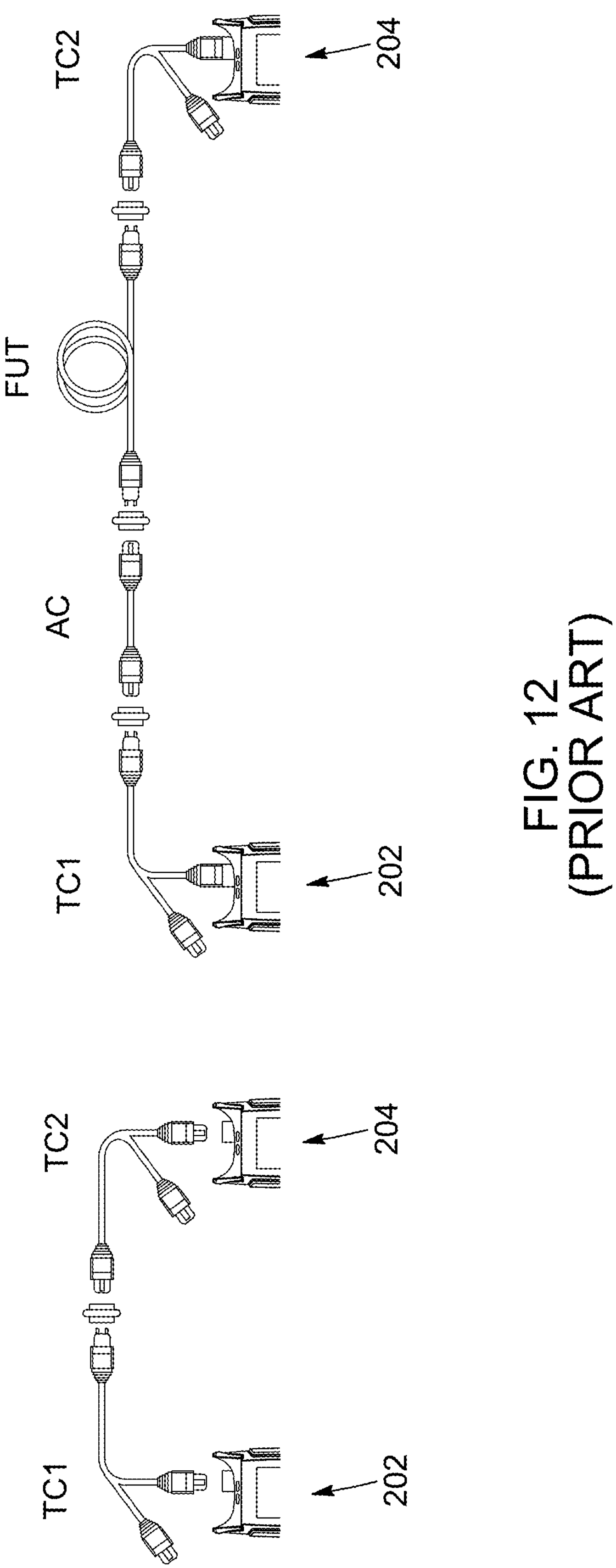
FIG. 12 is a schematic illustration of connections used for testing an MPO-24 optical-fiber cable using Y test cords, according to a conventional method (prior art).

According to another possible implementation, FIGS. 11A, 11B and 11C illustrate connections required to conduct the one-cord reference method when using an MPO-24 to MPO-12 connector adapter so as to test an MPO-24 optical-fiber cable using native MPO-12 test devices, in this case an MPO-12 light source and an MPO-12 power meter. To be able to test MPO-24 links with MPO-12 to MPO-24 connector adapters, the test procedure may be performed in a two-step test sequence, where two different connector adapters are used for each optical test device, one connector adaptor being configured for the first row of the MPO-24 cable (fibers 1-12), and another adaptor being configured for the second row of the MPO-24 cable (fibers 13-24). To test the first row of fibers of the MPO-24 cable, a connector adapter linking the 12 fibers of the test port of the optical test device to fibers 1-12 of the MPO-24 link may be used, as shown in the top left image of FIG. 11A. The second row of fibers of the MPO-24 cable can be tested using another connector adapter linking the 12 fibers of the test port of the optical test device to fibers 13-24 of the MPO-24 link, as shown in the top right image of FIG. 11A. These steps can be conducted for setting the reference parameters with a one MPO-24 reference cord TC1 MPO-24 to MPO-24, as shown on FIG. 11B, and then for testing the FUT MPO-24, as shown on the bottom right image of FIG. 11C. In order to reduce connector swap-out of as much as possible, in a possible embodiment, the MPO-12 to MPO-24 connector adapter connected on the test port of the light source 202 can be configured such that light entering the 12 fibers on the device connector is transmitted to all 24 fibers on the FUT connector. In other words, fiber interconnections provided inside the connector adapter can be configured so that light projected on fibers of the device connector is transmitted to all fiber interfaces of the FUT connector. This configuration of the MPO-12 to MPO-24 connector adapter allows keeping the same connector adapter on the light source instrument 202. As can be appreciated, while testing an MPO-24 link with connector adapter is performed in a two-step test process, this two-step process is still more advantageous than current methods employing a Y adapter-cord, as illustrated in FIG. 12. As can be seen on the left-hand side of FIG. 12, two reference Y-chords have to be used, which implies greater uncertainty in the measurements carried out to set the reference parameters. Although the example given with reference to FIGS. 11A-11C explains the use of a native MPO-12 optical test device to test MPO-24 fiber-optical cables, it is understood that the principle can be generalized to native m-fiber devices, enabling the testing of n-fiber cables, where n may be greater than m.

As per the examples illustrated in FIGS. 10A-10B and 11A-11C, for test applications requiring a light-source device 202 and power-meter device 204, connector adapters may be needed on both the light source 202 and the power meter devices 204. However, different types of m-to-n connector adapter may be needed for the light source and the power-meter devices 202, 204. For example, the connector adapter for the power meter 204 can comprise internal interconnection fibers having a large core, which would be incompatible for use with a light source device 202. Similarly, a connector adapter for connecting with a light source device 202 may comprise standard core fibers, which may be incompatible with a power meter device 204. More details on the one-cord reference method can be found in the patent publication No. US20220038177A1 to He et al., incorporated herein by reference.

To prevent connecting or inserting incompatible connector adapter and reduce the risk of manipulation errors, a mechanical component can be provided on the connector adapter or on the optical test device to prevent incompatible connector adapters from being inserted or connected to a given optical test device. The mechanical components can include tabs, pins, keys, guides or slides provided on the connector adapter, such that the connector adapter can only fit with corresponding components on the optical test device. For example, connector adapters can include such mechanical components that make it impossible to interchange a light source connector adapter with a power meter connector adapter. The mechanism preventing incompatible connector adapters from being used with certain types of optical test devices may include a visual identifier. For example, connector adapter intended to be used for a specific test device, such as a light source, may have a distinctive color casing that matches the color of the faceplate or test port of that specific test device. The connector adapter casing could also include a specific icon or marker that matches a corresponding icon or marker on the corresponding test device.

As can be appreciated, with the above-described connector adapters and configurable optical test devices, it is possible to convert a native test instrument, such as a MPO-12 OLTS (Optical Loss Test Set), a light source, a power meter or an OTDR (Optical Time Domain Reflectometer), into any type of tester. The proposed connector adapters allow in-field conversion of the interface/test port of the optical test device to adapt to different optical-fiber cables, regardless of the cable gender, pin, end face, or fiber configuration, including MPO-12, MPO-24 and duplex connectors. The described connector adapters and optical test devices allow end users to limit the number of optical test instruments to maintain, for example by keeping only one optical test device and a set of connector adapters needed for their applications. The adaptation of user interfaces, test parameters and test sequences, via the software application, based on the connector adapter used with the device, is also a great benefit since it reduces errors that could result from incorrect user manipulations and software configurations.

Of course, numerous modifications could be made to the embodiments described above without departing from the scope of the present disclosure.

The invention claimed is:

1. An optical test device for testing an optical-fiber cable, the optical test device comprising:
- a casing, including measurement components therein;
- a test port, comprising fiber interfaces configured to interface with a given number of optical fibers;
- a connector adapter removably connectable to the test port, the connector adapter comprising:
  - a device connector adapted to connect to the test port; and
  - a fiber-under-test (FUT) connector adapted to connect to an optical-fiber cable, the FUT connector being configured to interface with optical-fiber cables having a number of fibers that is different from the given number of fibers of the test port; and
  - a processing unit configured to adapt test parameters according to the number of fibers of the optical-fiber cable to be tested, wherein the connector adapter is shaped and configured as a cartridge, and wherein the casing comprises an adapter receiving cavity, the test port being provided inside the adapter receiving cavity.

2. The optical test device of claim 1, wherein the connector adapter is an n-to-m fiber adapter, where n is the number of fiber interfaces of test port and m is the number of fiber interfaces of the FUT connector.

3. The optical test device of claim 1, wherein the connector adapter is a fiber gender adapter, where one of the device connector and FUT connector of the connector adapter has a pinned interface and the other connector has an unpinned interface.

4. The optical test device of claim 1, wherein the processing unit is configured to automatically detect the type of connector adapter connected to the test port.

5. The optical test device of claim 1, wherein the connector adapter comprises a click-out mechanism allowing for a tool-free insertion and removal of the connector adapter from the test device.

6. The optical test device according to claim 1, being one of: an MPO-12 native test instrument, an MPO-24 native test instrument, an Optical Loss Test Set (OLTS), a light source, a power meter and an Optical Time Domain Reflectometer (OTDR).

7. The optical test device of claim 1, wherein the test device is a native MPO-12 test device, and the connector adapter is an MPO-12 to duplex connector adapter.

8. The optical test device of claim 1, wherein the test device is a native MPO-12 test device, and the connector adapter is an MPO-12 to MPO-24 connector adapter.

9. The optical test device of claim 1, wherein the processing unit is configured to detect a type of connector adapter connected to the test port based on a reference cable used during a reference setting procedure.

10. The optical test device of claim 1, comprising an identification system, allowing the processing unit to detect a type of connector adapter being connected to the test port.

11. The optical test device of claim 10, wherein the identification system comprises a tag provided on the connector adapter and a tag sensor provided in the optical test device, the tag providing an indication of the connector adapter type to the processing unit via the tag sensor, the adapting of the test parameters being made based on the connector adapter type detected.

12. The optical test device of claim 1, comprising a protection mechanism preventing unauthorized connector adapters from being used with the optical test device.

13. The optical test device of claim 1, wherein the processing unit comprises software application with a reference setting assistant module, the reference setting assistant module being adapted based on the connector adapter connected to the test port.

14. The optical test device of claim 1, wherein the processing unit comprises a software application configured to exclude fiber interfaces of the test port from being tested or from being reported, based on a type of connector adapter used.

15. The optical test device of claim 13, wherein the software application is configured to adapt an optical-fiber test sequence, based on the type of connector adapter used.

16. The optical test device of claim 13, wherein the reference setting assistant module is configured to enable reference parameters to be set for an optical-fiber cable having a number of fibers different from the number n of fiber interfaces of the test port using a one-cord reference optical-fiber cable, the software application enabling subsequent testing of the optical-fiber cable using the adjusted reference parameters.

17. The optical test device of claim 16, wherein the software application is configured to adjust test parameters of the optical test device by selecting only a subset of the fiber interfaces of the test port to conduct tests or measurements of the optical-fiber cable being tested.

18. The optical test device of claim 13, wherein the software application is configured to adapt graphical user interfaces reporting results of the test conducted according to the connector adapter used.

19. A connector adapter connectable to an optical test device for testing optical-fiber cables, the connector adapter comprising:

a device connector adapted to removably connect to a test port of the optical test device;

a fiber-under-test (FUT) connector adapted connect to an optical-fiber cable, the FUT connector having a number m of fiber interfaces that is different from a number n of fiber interfaces of the test port; and interconnections between the fiber interfaces of the device connector and the fiber interfaces of the FUT connector, to interface the m fibers of the optical-fiber cable to the n fiber interfaces of the test port; and an identification device allowing to identify a type of connector adapter being connected to the test port, wherein the connector adapter is shaped and configured as a cartridge, and wherein the casing comprises an adapter receiving cavity, the test port being provided inside the adapter receiving cavity.

20. A method for testing an optical-fiber cable with an optical test device, the optical test device having a test port with a number n of fiber interfaces while the optical-fiber cable as a number m of fiber interfaces, the method comprising:

connecting a connector adapter to the optical test device, the connector adapter having a device connector adapted to removably connect to the test port of the test device;

connecting an optical-fiber cable to a FUT connector of the connector adapter; and adjusting test parameters of the optical test device based on the connector adapter type being connected, wherein the connector adapter is shaped and configured as a cartridge, and wherein the casing comprises an adapter receiving cavity, the test port being provided inside the adapter receiving cavity.

* * * * *